Feb. 21, 1961     L. L. WINTER     2,972,552
ALL CARBON IMPERVIOUS GRAPHITE AND
CARBON ARTICLES
Filed March 8, 1957

```
┌─────────────────────────┐
│  Porous Carbon Article  │
└───────────┬─────────────┘
            │
            │                    ┌──────────────────────────┐
            │                    │  Heat Sensitive Resin    │
            │                    │       Impregnant         │
            │ 50 cps. viscosity  │  Decomposition Product   │
            │◄───────────────────│   of Furan-Ketone        │
            │                    │  Condensation Product    │
            │                    └──────────────────────────┘
            ▼
   ┌──────────────────┐
   │    Heat Under    │
   │    Pressure      │
   │       to         │
   │   Polymerize     │
   │      and         │
   │   Cure the       │
   │     Resin        │
   └────────┬─────────┘
            ▼
   ┌──────────────────┐
   │  Heat to 270°C.  │
   │ at rate of 10°C. │
   │    per hour      │
   │ Heat from 270°C. │
   │       to         │
   │  1000°C. at rate │
   │   of 5°-10°C.    │
   │    per hour      │
   └────────┬─────────┘
            ▼
┌──────────────────────────┐
│  Impervious Carbon Article │
└──────────────────────────┘
```

INVENTOR.
LESTER L. WINTER
BY
*Robert C. Cummings*
ATTORNEY

United States Patent Office 2,972,552
Patented Feb. 21, 1961

2,972,552
ALL CARBON IMPERVIOUS GRAPHITE AND CARBON ARTICLES

Lester L. Winter, Fostoria, Ohio, assignor to Union Carbide Corporation, a corporation of New York Filed Mar. 8, 1957, Ser. No. 644,711

2 Claims. (Cl. 117—46)

This invention relates to impervious carbon and graphite articles. More particularly, this invention relates to a method of making porous carbon and graphite articles impervious to fluids or gases even at elevated temperatures.

In the conventional method of making carbon or graphite articles it is customary to prepare a mix consisting of carbon and a binder. The bulk of the mix is carbonaceous matter. The binders utilized have been composed of matter which usually is thermoplastic and which carbonizes upon being heated at elevated temperatures. By the application of heat during the mixing process, the binder is melted. The function of the melted or fluidized binder, at this stage of the operation, is to wet the surface area of the carbonaceous particles and to render the mix fluid. The mix is adjusted to a homogeneous consistency by means of mechanical agitation and the application of elevated temperatures. After the mix is made homogeneous the temperature of the mix is lowered to a point at which the mix remains plastic enough to be extruded and still possesses a consistency enough to be shaped on extrusion. Under the pressure of extrusion and the effect of lower temperatures, the particles will be bonded together as they come in contact with one another. This bonding effect is facilitated by the fact that a thin film of binder adheres to the surfaces of the carbonaceous particles and acts as an adhesive when other particles come in contact with the "wetted" carbonaceous particle.

The mix is extruded to the desired shape, and is subsequently baked. The baking process tends to drive off the volatile vapors of the binder remaining after the mixing and extrusion processes. Baking schedules, with their inherent factors of time and temperature, vary according to the size and shape of the article and the character of the binder. After the baking process, the carbon article is capable of being handled without deforming. The carbon article produced by the aforesaid conventional process, may be further heated at elevated temperatures to produce a graphitized article.

The utility of the conventionally produced article is limited by its density, porosity and permeability. For many years a need has existed for an improved carbon article which would remain impervious at elevated temperatures for long periods of time. However, in the conventional processes, the particular binder utilized has an effect upon the density and porosity of the final product. Many type binders have been utilized, but impervious carbon articles have not, to date, been produced by the methods described. The underlying reason for this lack of desired imperviousness is due to the volatilization of the binder. In the extrusion stage the carbonaceous particles are bonded together by a thin film of binder and when the binder volatilized interstitial openings or pores are produced in the carbon article. This volatilization renders the shaped carbon article porous and permeable to liquids and gases.

Industry has recognized the aforesaid difficulties and it has been proposed to coat the surfaces of the article with organic materials to render the final product impervious. However, such coated articles do not retain their impervious character under many erosive conditions. A more common practice has been to fill the interstitial openings of the conventionally produced carbon article with organic resins. Heretofore the resins utilized have been found to be unstable over 250° C. and of limited utility at high temperatures. This instability of the resin may upon heating to such temperatures characterize itself by volatilization or exudation of the resin or spalling of the article, depending upon the nature of the resin impregnant. Also it has here been found, that the cross section of the conventionally resin treated carbon articles is not made uniformly impermeable, and if the surface skin or a section of the treated article is machined away from the article again becomes permeable. Still another common practice has been to fill the interstitial openings of the carbon article with inorganic compounds. However, the inorganic compounds must be very carefully selected so that they will not dissolve in liquid or gaseous atmosphere. The selection of a proper inorganic compound has generally been found to be difficult and sometimes prohibitive because of the inorganic compound's expense.

It is an object of this invention to produce a superior impervious all carbon article which has lower porosity than articles which have heretofore been manufactured by conventional processes.

Another object of this invention is to render a substantially all carbon article impervious throughout its entire cross section.

Another object of this invention is to produce a substantially all carbon article which will remain impervious under varying conditions, even after undergoing the harsh erosive action or effect of ordinary usage.

Another object of this invention is to produce an impervious carbon article the interstitial passages of which contain microbubble formations of coked impregnants which are stable at elevated temperatures.

Another object of this invention is a process for the production of improved carbon articles having the aforesaid properties.

This invention comprises an impervious carbon article, the normally occurring pores, crevices and inter-connecting passages of which are blocked substantially throughout its cross section by carbon derived from coking residues which are decomposition products of a thermosetting resin. The blocking of the openings, crevices, and inter-connecting passages of the carbon article by microbubble formations of carbonized residue renders it uniformly impervious to fluids throughout its entire body. The carbon article of this invention is characterized by substantially complete imperviousness which is retained at elevated temperatures well above 250° C.

This invention also comprises a carbon article of reduced permeability. This carbon article of reduced permeability is an intermediate product in the process of producing an impervious carbon article. The degree of permeability of said carbon article depends on the properties of the base carbon article and the number of cycles of the process said base carbon article has been exposed to.

The invention also comprises a process for producing such articles, in which process carbon articles to be treated are pressure impregnated with a liquid of low viscosity comprising a heat-sensitive resin, preferably of the thermosetting type. During impregnation the resinous liquid penetrates into the interstices, pores, and interconnecting passages of the carbon article. After penetration of the resinous liquid into the carbon article's pores, openings, and inter-connecting passages the resin is polymerized and cured in situ by heating. Subsequently the treated article is slowly baked under nonoxidizing conditions to carbonize the resin within the pores, passages, and crevices of the carbon article. The carbon or graphite article treated by the aforesaid process is rendered impervious to liquids and gases. It has even been found that carbon articles produced by the process of the present invention are impervious to nitrogen pressures maintained at 50 pounds per square inch at temperatures above about 500° C. Furthermore when the carbon articles of the present invention were subjected to mercury pressures of 100 pounds per square inch, no measurable penetration was encountered. Also, the present carbon articles were found to be impenetrable to 100 pounds per square inch of liquid bismuth at a temperature of about 650° C.

The invention will be more readily understood by reference to the accompanying drawing wherein the single figure is a flow diagram illustrating the preferred method for making the impervious articles of the invention. Each step in this method is more fully set forth below.

It is emphasized that the present invention contemplates an impregnation of a resin into the interstitial passages or pores of a carbon article, rather than an application of a surface coating to the article. The underlying principle of this improvement is the use of a resin (referred to herein as a thermosetting resin) which not only penetrates into the interstitial passages and pores of the carbon article but which can also be coked in situ and which during curing and coking froths or intumesces. This frothing produces a myriad of tiny, isolated closed cell cellular structures (referred to herein as "microbubbles") within the interstices or pores of the treated article. During final heating the frothed resin is converted to a carbonaceous residue. The resulting carbonaceous residue in the form of microbubbles is substantially impervious and blocks the interstitial passages or pores of the treated carbon article and prevents the passage of liquid or gas through the article, even at elevated temperatures.

It is recommended that the base or original carbon or graphite article utilized in making a final impervious article possesses the following properties, viz. high strength, low permeability and structural freedom from flaws, laminations or other physical imperfections. Flaws and laminations of the original carbon article are undesirable because they result in an increased susceptibility to spalling, and a greater number of "treats" are required to achieve imperviousness. A "treat" as used in this disclosure means one complete cycle of the present process. Probably the biggest factor in spalling of carbon articles during resin curing is a non-uniform laminated structure often imparted to the article during its forming.

A good base carbon article generally has a flexural strength of 4500 to 5000 pounds, a permeability of about 0.2 Darcy, a density of about 1.7 grams per cubic centimeter and an average pore size of about 0.15 to 0.2 micron. The Darcy is defined as the flow of a cubic centimeter per second per square centimeter per atmosphere per centimeter for a gas of one centipoise viscosity. Although this is the recommended base carbon article, it is not to be construed as a limitation because any grade or type carbon article may be rendered impervious by the present process.

When a base carbon or graphite article is used having the physical properties as described aforesaid, only a small quantity of additional carbon is required to fill the pores and prevent diffusion of liquids or gases through the mass of the carbon article. Depending upon the variation of the aforesaid properties one to seven "treats" may be required.

The heat-sensitive resin that is used in the present process should be of low viscosity when utilized as an impregnant and should also possess a high coking value. The resin should be rendered to a viscosity below about 50 centipoises before impregnation and its coking value should be at least 20 percent. The coking value is defined as the amount of coke remaining after the resin is thermally degraded by heating to 1000° C. The resin used in the present process should be of a low viscosity during the impregnation stage because it has been found that if the viscosity is too high the desired quality of imperviousness is not produced in the final article, even with multiple treats. Typical examples of thermosetting resins possessing the desired physical properties and which may be utilized successfully in the process are: furan-ketone condensation products, such as mixtures of hydrogenated mono- and di-furfuryl acetones.

The addition of excess amounts of high thermal expansive coke into the pores of the carbon or graphitized base article enhances the tendency of the material to crack or spall. Keeping the percentage of added carbon, through resin impregnation, to not more than 5 percent to 8 percent by weight of the original base carbon article minimizes the possibilities of spalling or cracking of the article.

Prior to impregnation, the resinous liquid impregnant, is warmed. Warming of the resin impregnant decreases its viscosity and tends towards ease of penetration of the fine pores of the article's structure. A more complete and uniform impregnation is achieved when pressure is subsequently applied to force the resinous liquid into the article's interstices or pores.

The resinous liquid which is entrapped in the interstitial openings of the treated carbon article is polymerized. The character of the resinous liquid impregnant will usually determine the method of polymerization which is utilized. The two major methods of polymerizing said resinous liquid impregnant are by the use of a catalyst or the application of heat or both. Either method may be successfully utilized in the present process. However, a catalyst is generally used in the polymerizing stage of the process to lower the polymerization temperature of the resinous impregnant to the working temperature of the process. Also, the utilization of a catalyst shortens the cure time of the resin. The following are examples of some of the catalysts which may generaly be utilized in this invention, viz. benzene sulfonic acid, toluene sulfonic acid, hydrchloric acid and ethyl sulfate.

After the impregnation stage of the process, the resin is cured in situ. It has been found that pressure curing is desirable to prevent excessive stewing of the resin. Stewing is the exudation of the resinous liquid from the interior of the treated article. Also the retention of the maximum amount of the resin in the carbon article's pores is facilitated by pressure curing.

Subsequent to curing stage the carbon article is baked. A slow rate of rise of 10° C. per hour to 270° C. assures uniform temperature through the cross section of the resinous treated article and uniform stress relief in the cured resin which aids in decreasing the tendency of serious spalling and cracking of the carbon article. Between 250° C. and 270° C. the resin impregnant begins to decompose and internal gas pressure develops. To compensate for this pressure buildup, the temperature is held at 270° C. to allow these gases to evolve. This gaseous evolution eliminates the possibility of a buildup of pressure sufficient to spall the article. Above 270° C. degradation of the resin impregnant proceeds rapidly and is substantially completed at about 450° C. to 500° C. From 270° C. to 1000° C. a rate of rise of 5° C. to 10° C. per hour has been found satisfactory.

Although as indicated, degradation of the resin impregnant is substantially complete at temperatures of about 500° C., it is desirable for stress relief to bake at a temperature well above that figure. Generally maximum shrinkage of the decomposition products occurs at temperatures of about 600° C. to 700° C. Particularly, where a number of treating cycles are repeated, it is preferable that baking be conducted at temperatures above 700° C. up to say about 1000° C.

Baking may be continued beyond the initial temperature of 500° C. to 1000° C. if it is desired to graphitize the treated carbon article. Graphitization ordinarily is complete upon baking at temperatures not above about 3000° C. A graphitization stage is utilized in the process if it is desired to relieve all of the strain in the carbon article resulting from impregnation of the resin. Also, graphitization renders the article more shock-resistant.

Examination of the interstices of many of the treated articles indicate that the articles have been rendered uniformly impervious throughout their cross setcions in a treating cycle. However, it can generally be found that the permeability after one treating cycle is between the range of less than 1 percent to 15 percent of the permeability of the base carbon article. Also, a subsequent treatment of this same carbon article will result in a permeability of 0.04 percent to 6.0 percent of the permeability of the base carbon article. The aforesaid reduction in permeability is advantageous if it is desired to produce specialty carbon articles of desired permeabilities.

If it is desired to multi-treat the carbon or graphite article it is necessary to remove the surface varnish after each treat. Surface varnish constitutes a shiny thin carbon deposit formed on the surface of a "treated" article by the cracking of hydrocarbon fragments from the decomposed resin. These deposits are often so dense and impervious that the interstitial passages are blocked by the coke formed at the surface of the article. To effectively multi-treat a carbon or graphite article it is necessary to remove the varnish from the outside and inside of the article after each treatment, for instance by sand papering.

Example I gives a typical procedure for rendering carbon pipes impervious in accordance with the invention, with results of such treatment set forth in Tables I and II.

EXAMPLE I

Three different samples of graphite pipe sections of differing densities and permeabilities were placed in an autoclave. The chamber of the autoclave was evacuated for 30 minutes to a pressure below 5 millimeters of mercury. A liquid comprising a mixture of hydrogenated mono- and di-furfural acetone containing 8 percent neutral diethyl sulfate was drawn into the evacuated chamber. The temperature of the resin was maintained at 50° C. to 60° C. during impregnation. When samples were completely covered with warm resin the vacuum valve was opened and a pressure of 80 to 100 pounds per square inch of nitrogen was applied for a 2 hour period. At the conclusion of this impregnation period the resin was removed from the autoclave and the impregnated pipe was cured under 80 to 100 pounds per square inch of pressure and at a temperature of 75° C. for 6 hours. The pipe specimens were then removed and curing was completed in an oven at 100° C. for 8 hours. The baking schedule adopted for the pipe was 10° C. per hour to 270° C., with a 24 hour hold at 270° C., followed by a 10° C. per hour rise to 1000° C.

Tables I and II below show the effect on density and permeability on a number of sampels of treatment in a number of cycles of the type discussed in Example I.

Table I

| Sample | No. of Treats | Original Density | Final Density |
|---|---|---|---|
| 1 | 3 | 1.69 | 1.93 |
| 2 | 2 | 1.87 | 1.92 |
| 3 | 3 | 1.82 | 1.91 |

Bulk densities of 1.9 to 1.93 are usually reached before the carbon article is rendered impervious.

Table II

| Sample | No. of Treats | Permeability Before Treatment | Permeability after Treatment |
|---|---|---|---|
| 1 | 3 | 0.03 Darcy's | Impervious to nitrogen under 75 pounds per square inch pressure. |
| 2 | 2 | 0.009 Darcy's | Do. |
| 3 | 3 | 0.015 Darcy's | Impervious to nitrogen under 40 pounds per square inch pressure. |

It has been found that the pores of carbon articles treated by the present process are generally completely and uniformly blocked, not only on the surface portion but throughout the articles' cross section. Consequently the surfaces of these treated carbon articles can, when desired, the machined away without rendering the article permeable. It has also been found that the erosive effects of ordinary usage does not destroy the impervious character of the treated carbon article.

I claim:

1. A carbon article; the interstitial openings of which are substantially blocked by carbonaceous deposits in the form of isolated microbubbles, said carbonaceous deposits comprising the decomposition product of furanketone condensation product, said article being substantially impervious throughout its cross section.

2. A carbon article, a sufficient number of interstitial openings thereof being closed by carbonaceous deposits in the form of isolated microbubbles to render said article fluid-impervious, said carbonaceous deposits comprising the decomposition product of a mixture of hydrogenated mono-and di-furfury acetone, said article being impervious to nitrogen pressure maintained at 50 pounds per square inch at temperatures above 500° C., to mercury pressures of 100 pounds per square inch, and to 100 pounds per square inch of liquid bismuth at a temperature of about 650° C.

References Cited in the file of this patent

UNITED STATES PATENTS

| | | |
|---|---|---|
| 942,852 | Backeland | Dec. 7, 1909 |
| 1,014,882 | Jones | Jan. 16, 1912 |
| 1,556,990 | Henry | Oct. 13, 1925 |
| 1,620,940 | Bleecker | Mar. 15, 1927 |
| 2,087,724 | Sanders | July 20, 1937 |
| 2,174,887 | Kiefer | Oct. 3, 1939 |
| 2,224,724 | Elsey | Dec. 10, 1940 |
| 2,345,966 | Fiedler et al. | Apr. 4, 1944 |
| 2,518,919 | McKinstry et al. | Aug. 15, 1950 |

FOREIGN PATENTS

| | | |
|---|---|---|
| 757,883 | Great Britain | Sept. 26, 1956 |